United States Patent Office 3,380,986
Patented Apr. 30, 1968

3,380,986
PROCESS FOR THE ADDITION OF WATER-IN-SOLUBLE SOLID SUBSTANCES TO CRYSTALLINE POLYOLEFINES
Henricus A. van Vucht, Geleen, Netherlands, assignor to Stamicarbon N.V., Heerlen, Netherlands
No Drawing. Filed Dec. 10, 1964, Ser. No. 417,468
Claims priority, application Netherlands, Dec. 13, 1963, 301,827
12 Claims. (Cl. 260—94.9)

The present invention relates to a process for the addition of water-insoluble solid substances to crystalline polyolefines prepared by a process in which they are obtained as a suspension in an organic diluent and in which the catalyst is deactivated and removed and at least the greater part of the diluent is also removed, e.g. by filtration or contrifugation, and the polymer particles are subsequently suspended in water and finally isolated from this suspension.

The invention is of particular importance in the case of crystalline polyolefines—both homopolymers and copolymers—prepared by polymerization of one or more α-olefines in an organic diluent in the presence of a coordination catalyst, i.e. a catalyst prepared from a metal or from an organic compound or a hydride of a metal belonging to any of the groups I to IV of the Periodic System of the Elements according to Mendeleef and a compound of a heavy metal belonging to any of the sub-groups IV to VIII of the said system. This polymerization yields a suspension of the polyolefine in the diluent, from which suspension the polyolefine can be recovered after deactivation and removal of the catalyst. Several methods have been developed for this purpose, many of them having in common the removal of the diluent in one or more stages and the suspension of the polyolefine in water.

The catalyst can be deactivated by treating the suspension of the polyolefine in the organic diluent with a liquid which converts the catalyst into soluble compounds that can be removed together with this liquid. Suitable deactivators are, for instance, ketones or alcohols to which, if so desired, a small amount of a mineral acid, such as hydrochloric acid, may have been added. A particularly effective method of carrying out the deactivation consists in passing the suspension of the polyolefine in the diluent through a pulsation column together with methanol. After that, the deactivated suspension can be passed through a second pulsation column in counter-current relation to water, in which case the methanol and the catalyst residues are removed by the water. The resulting purified suspension can then be filtered or centrifuged, after which the polyolefine can be suspended in hot water, as a result of which the remainder of the diluent evaporates. In most cases a surface-active substance is added to the water, which makes the polyolefine more readily suspensible in water.

The purified polyolefine can be separated, for instance by filtration or centrifugation, from the aqueous suspension obtained in any of the possible ways, and after that can be dried with air or nitrogen. In most cases one or more other substances, such as fillers, anti-static agents, pigments, lubricants, blowing agents, stabilizers, anti-oxidants and anti-blocking agents, are then added. As a result, the polyolefine can be processed more readily and/or the properties of the products made from it will be improved. Mixing of the dry polyolefine with the added substances is an expensive operation, however, because it calls for large-sized and costly special equipment, as a result of which the mixing costs make up a considerable part of the cost price of the finished product. Moreover, it is often difficult to obtain a homogeneous mixture in this way.

It is known that certain substances, viz. esters of phosphoric acid and of phosphorous acid, can be mixed with polyolefines by adding them to an aqueous suspension of the polyolefine and thereafter separating the polyolefine from the water and drying (French patent application No. 1,158,262). The applicant has found however, that this method is unsuitable for mixing polyolefines with water-insoluble solid substances, as the resulting mixture is not sufficiently homogeneous for direct processing, so that also in this case a separate treatment is required to homogenize the mixture.

An object of the present invention is to provide a process for the addition of water-insoluble solid substances to crystalline polyolefines, which process is much simpler and cheaper than the known methods, owing to the fact that it does not call for separate mixing devices, and in most cases is also more efficient.

Another object of the invention is to provide crystalline polyolefines coated with water-insoluble solid substances, which polyolefines form a homogeneous mixture in normal processing without special treatments being required.

The invention has as a further object to provide a process in which the water-insoluble solid substances can be continuously added to the polyolefine in a simple way.

The process according to the invention is particularly adapted for the addition of water-insoluble solid substances to crystalline polyolefines prepared by a process in which they are obtained as a suspension in an organic diluent and in which the catalyst is deactivated and removed and at least the greater part of the diluent is also removed, e.g. by filtration or centrifugation, and the polymer particles are subsequently suspended in water and finally isolated from this suspension. The process is characterized in that the water-insoluble solid substances are dispersed in water with the aid of a surface-active substance, after which the dispersion is added to the aqueous suspension of the polyolefine.

Crystalline polyolefines which can be treated by the process according to the invention are, for instance, polyethylene, polypropylene, polybutylene-1 and crystalline copolymers of ethylene and propylene or of either of these monomers with other monomers, and also block polymers.

The process according to the invention can be utilized for the addition of both large amounts of water-insoluble substances, e.g. 2–10% by weight, and small amounts, e.g. 0.002–2% by weight, with respect to the polyolefine. In both cases the water-insoluble substances are evenly distributed over the polyolefine after the latter has been isolated from the aqueous suspension. This distribution is so uniform that a homogeneous mixture is obtained during processing of the polyolefine, e.g. during extrusion to granules, so that a special mixing treatment may be omitted.

Although according to the invention larger amounts of water-insoluble solid substances can also be added, the process is of particular importance for the addition of substances which are used in relatively small amounts, such as anti-static agents, pigments, lubricants, stabilizers, anti-oxidants and anti-blocking agents. Examples of such additives are: 2,2'-dihydroxy(4-methoxy)benzophenone, 2-hydroxy, 4-n-octoxybenzophenone, 2-hydroxyphenylbenzotriazole, di-tert. butylparacresol, 2,2-methylene bis-(4-methyl 6-tert. butylphenol), dilaurylthiodipropionate, distearylthiodipropionate, 4,4'-thiobis(6-tert. butyl 3-methylphenol), 4,4'-butylidene bis(6-tert. butylmetacresol), oleic acid amide, stearic acid amide, carbon black, magnesium oxide, zinc oxide, calcium oxide, calcium stearate, calcium carbonate, etc.

It has been found that the water-insoluble substances deposit on the polymer particles, as a result of which a particularly good distribution is achieved. Since crystalline polyolefines are not sticky, it was not to be expected that the water-insoluble substances would adhere to the polyolefine. It is furthermore extremely surprising that very finely divided solid substances, which might be expected to be easily entrained during the drying of the polyolefine by the gas used for this purpose, largely, and often even completely, remain in the polyolefine.

The water-insoluble solid substances are added to the aqueous suspension of the polyolefine after the catalyst has been deactivated and removed, and after also the larger part of the organic diluent has also been removed, so that evaporation will suffice to expel the last traces of this diluent. If in this evaporation a surface-active substance is applied, it will be advantageous to use this for the dispersion in water of the water-insoluble solid substance, as a result of which, the the two substances can be added simultaneously and continuously in a vary simple way.

If the water-insoluble solid substance can be dissolved in the surface-active substance, a solution of the former substance in the latter is preferably prepared first, after which the said solution is dispersed in water. This procedure offers the advantage that a very fine dispersion is obtained, as a result of which the homogeneous distribution of the water-insoluble substance over the polyolefine is promoted.

The invention will be elucidated by means of the following examples. The polyethylene used therein was obtained in the following way. Usig the Ziegler method, ethylene was polymerized in gasoline in the presence of a catalyst prepared from titanium tetrachloride and an alkyl-aluminium compound. The catalyst was deactivated with methanol, and this methanol together with the catalyst residues were removed by washing with water. The resulting purified suspension of polyethylene in gasoline was centrifuged, yielding a wet product about 25% by weight of which consisted of gasoline, the remainder being polyethylene. This wet polyethylene was used in the Examples 1–4.

EXAMPLE 1

4.5 parts by weight of 4,4'-thiobis-(6-tert. butyl metacresol) was dissolved in 15 parts by weight of a water-soluble alkylphenolpolyglycol ether at a temperature of about 75° C. With simultaneous stirring, the solution was then added to 220 parts by weight of water having a temperature of 60° C. The resulting dispersion was then cooled to room temperature.

Simultaneously 1 kg. of the wet, gasoline-containing polyethylene, and 10 g. of this dispersion were added to 10 litres of water having a temperature of 80° C. After the gasoline had evaporated, the remaining suspension of polyethylene in water was centrifuged and the wet polyethylene was dried in a current of air. The dry product weighed 750 g. and contained 0.02% by weight of 4,4'-thiobis-(6-tert. butyl metacresol).

EXAMPLE 2

4.5 parts by weight of 4,4'-thiobis-(6-tert. butyl metacresol) was dissolved in 15 parts by weight of a water-soluble alkylphenolpolyglycol ether at a temperature of about 75° C. With simultaneous stirring, the solution was added to a suspension of 4.5 parts by weight of magnesium oxide in 210 parts by weight of water having a temperature of 60° C., the resulting dispersion being cooled to room temperature.

Simultaneously 1 kg. of the wet, gasoline-containing polyethylene, and 10 g. of this dispersion were added to 10 litres of water having a temperature of 80° C. After the gasoline had evaporated, the suspension of polyethylene in water was centrifuged and the wet polyethylene was dried in a current of air. The dry product weighed 745 g. and contained 0.02% by weight of 4,4'-thiobis-(6-tert. butyl metacresol) and 0.02% by weight of magnesium oxide.

EXAMPLE 3

2.5 parts by weight of 4,4'-thiobis-(6-tert. butyl metacresol) was dissolved in 12 parts by weight of a water-soluble alkylphenol polyglycol ether at a temperature of about 75° C. With simultaneous stirring, the solution was added to a suspension of 2.5 parts by weight of magnesium oxide in 80 parts by weight of water having a temperature of 60° C., the resulting dispersion being cooled to room temperature.

Simultaneously 1 kg. of the wet, gasoline-containing polyethylene, and 10 g. of this dispersion were added to 10 litres of water having a temperature of 80° C. After the gasoline had evaporated, the suspension of polyethylene in water was centrifuged and the wet polyethylene was dried in a current of air. The dry product weighed 748 g. and contained 0.03% by weight of 4,4'-thiobis-(6-tert. butyl metacresol) and 0.03% by weight of magnesium oxide.

EXAMPLE 4

5 parts by weight of 4-methyl-2,6-di-tert. butylphenol was dissolved in 5 parts by weight of a water-soluble alkylphenolpolyglycol ether at a temperature of about 70° C. With simultaneous stirring, the solution was then added to 200 parts by weight of water having a temperature of 50° C. The resulting dispersion was then cooled to room temperature.

15 g. of this dispersion were added to a suspension of 1 kg. of the wet, gasoline-containing polyethylene in 10 litres of water having a temperature of 85° C. After the gasoline had evaporated, the remaining suspension of polyethylene in water was centrifuged and the wet polyethylene was dried in an air current. The dry product contained 0.045% by weight of 4-methyl-2,6-di-tert. butylphenol.

EXAMPLE 5

10 g. of bislaurylthiodipropionate and 4 g. of 4,4'-butylidene bis (6-tert. butyl metacresol) was dissolved in 8 g. of a water-soluble alkylphenolpolyglycol ether at a temperature of about 70° C. With simultaneous stirring, the solution was then added to 500 g. of water having a temperature of 15° C.

The resulting dispersion was added to a suspension of 750 g. of polyproplene in 10 litres of water of 15° C. The mixture was stirred and then centrifuged. The wet polypropylene was dried in a current of air. The dry product contained 1.8% by weight of the additives.

What is claimed is:

1. A process for the addition of water-insoluble solid substances to crystalline polyolefins said polyolefins prepared by a process in which they are obtained as a suspension in an organic diluent and in which the catalyst is deactivated and removed and at least the greater part of the diluent is removed, the said process being characterized in that the water-insoluble solid substances are dispersed in water with the aid of a surface-active substance, after which the dispersion and the wet diluent-containing polyolefin are mixed with each other in water, whereby a suspension of polyolefin coated with water-insoluble solid substance is formed, and the resulting polyolefin is separated from the suspension.

2. A process in accordance with claim 1 wherein the water-insoluble solid substance is first dissolved in said surface-active substance, after which the reulting solution is dispersed in water.

3. A process in accordance with claim 1 wherein the water to which the dispersion and the wet diluent-containing polyolefin are added is hot enough to evaporate off the remaining diluent.

4. A process in accordance with claim 1 wherein said water-insoluble substance comprises 4,4'-thiobis-(6-tert. butyl metacresol).

5. A process in accordance with claim 1 wherein said water-insoluble solid substance comprises 4,4'-thiobis-(6-tert. butyl metacresol) and magnesium oxide.

6. A process in accordance with claim 4 wherein the water-insoluble substance is in an amount of 0.002-2% by weight with respect to the polyolefin.

7. A process for the preparation of crystalline polyolefins homogeneously coated with water-insoluble solid substances, said polyolefins having been prepared by a process in which they are obtained as a suspension in an organic diluent and in which the catalyst is deactivated and removed and at least the greater part of the diluent is also removed, and the polymer particles are subsequently suspended in water, the said process being characterized in that the water-insoluble solid substances are dispersed in water with the aid of a surface-active substance, after which the dispersion is added to the aqueous suspension of the polyolefin whereby a coating of the water-insoluble solid substance on the polyolefin is formed, and the resulting polyolefin is separated from the suspension.

8. A process in accordance with claim 7 wherein the water-insoluble solid substance is first dissolved in said surface-active substance, after which the resulting solution is dispersed in water.

9. Crystalline polyolefine particles which are homogeneously coated with water-insoluble solid substances in accordance with the process of claim 1.

10. Shaped objects comprising crystalline polyolefines obtained by the process of claim 1.

11. A process in accordance with claim 1 wherein a homogeneous mixture of solid and polyolefin is obtained during normal processing of the coated polyolefin.

12. A process in accordance with claim 1 wherein a homogeneous coating of water insoluble solid substance on said polymer is formed upon mixture of the dispersion and the wet diluent-containing polyolefin.

No references cited.

JOSEPH L. SCHOFER, *Primary Examiner.*

L. EDELMAN, *Assistant Examiner.*